United States Patent
Scarpinato

[11] Patent Number: 6,084,236
[45] Date of Patent: Jul. 4, 2000

[54] SYSTEM FOR MOUNTING A HUBLESS GLASSMASTER ONTO AN ORDERS MEASUREMENT DEVICE

[75] Inventor: Joseph M. Scarpinato, Williamstown, N.J.

[73] Assignees: Sony Corporation, Tokyo, Japan; Sony Electronics, Inc., Park Ridge, N.J.

[21] Appl. No.: 09/121,046

[22] Filed: Jul. 23, 1998

[51] Int. Cl.[7] .................................................. H01J 5/02
[52] U.S. Cl. ...................................... 250/239; 250/559.4
[58] Field of Search ............................... 250/239, 559.33, 250/559.3, 221, 559.4; 369/270, 263, 282

[56] References Cited

U.S. PATENT DOCUMENTS

| | | | |
|---|---|---|---|
| 5,633,856 | 5/1997 | Mukawa | 369/270 |
| 5,666,347 | 9/1997 | Yoshida et al. | 369/282 |

*Primary Examiner*—Que T. Le
*Attorney, Agent, or Firm*—Ronald P. Kananen; Rader, Fishman & Grauer

[57] ABSTRACT

A system for mounting a hubless glassmaster onto a spindle of an orders measurement device includes a magnet and a hub made of a magnetic material. The hub is designed to fit on the spindle of the measurement device. The magnet is placed on a top surface of the glassmaster and the hub is centered and placed on the bottom surface of the glassmaster opposite the magnet. The magnetic forces between the magnet and the hub hold the hub securely to the glassmaster as it is mounted onto the spindle and rotated in the measurement device. In a preferred embodiment, the hub is first placed in an alignment fixture and the glassmaster and magnet are placed on top of the hub to secure the hub to the glassmaster. The glassmaster assembly is then removed from the alignment fixture for mounting. The system allows both hubbed and hubless glassmasters to be tested on the same orders measurement device without having to affix a hub permanently onto the hubless glassmasters with adhesive.

7 Claims, 3 Drawing Sheets

SYSTEM FOR MOUNTING A HUBLESS GLASSMASTER ONTO AN ORDERS MEASUREMENT DEVICE

TECHNICAL FIELD

The present invention relates to an apparatus for holding a glassmaster onto an orders measurement device, and more particularly to a glassmaster holding apparatus that can hold a glassmaster regardless of whether the glassmaster has a hub.

BACKGROUND ART

In compact disc fabrication, a glassmaster ("glass") is used to generate patterns that will used later in the CD manufacturing process to stamp the CD's themselves. Thus, the accuracy of the pits and lands on the glass will ultimately determine the quality of the CD's.

One of the most common methods for creating CD's is a stamper-injection molding process. In this method, a glass master is coated with a photoresist layer, and the layer is developed using a laser to create the pit geometry that holds the data in the CD. The glass is then used to form stampers for stamping the CD's out of transparent polycarbonate or a similar material. The CD's are then coated with a thin reflective metal layer and then a protective acrylic layer.

Before the CD's are actually stamped, however, the accuracy of the glassmaster must be checked using an orders measurement device. The device measures the pit geometry on the glass by focusing a laser beam on the glass and measuring the orders of diffraction resulting from the laser beam being refracted and reflected by the pits as the glass is rotated. The minuscule dimensions of the pits on the glass require that the glass be held securely in place as laser beams are directed through it; any erroneous movement of the glass during the scanning process will cause a misreading.

Many glasses, such as those used by Philips, have a hub attached to the center of the glass with adhesive, and this type of glass is normally loaded onto a rotation spindle in the orders measurement device so that the spindle extends through the hub to anchor the glass in place as it is being checked by the device. Because the hub is permanently attached to the glass, the hub and the glass are kept concentric with respect to each other for accurate scanning.

Not all glasses have a hub in the center to accommodate the spindle in the orders measurement device, however. In fact several companies use hubless glasses, which are essentially flat glass discs with no center hubs glued to the surface. Without the hub, there has been no known way to mount the glass on the spindle of the orders measurement device. Although it is possible to use adhesive to attach hubs to the hubless glasses, this process can become time-consuming and add unnecessary manufacturing steps.

It is therefore an object of the present invention to construct a device that allows hubless glassmasters to be mounted on a spindle of an orders measurement system that is specifically designed for testing hubbed glasses without altering the basic structure of the hubless glass.

SUMMARY OF THE INVENTION

Accordingly, the present invention is directed to a system for adapting a hubless glass so that it can be aligned and mounted on a spindle of an orders measurement device designed for hubbed glasses. The system includes a magnet and a hub made of a magnetic material. Before the glass is to be tested, the magnet is placed on the top surface of the glass and the hub is centered and placed on the bottom surface of the glass opposite the magnet such that the center of the glass is sandwiched between the magnet and the hub. The magnetic forces between the magnet and the hub hold the hub securely in place as it is placed on the measurement device's spindle and rotated by the orders measurement device during testing.

In a preferred embodiment, the system uses an alignment fixture for precisely aligning the hub so that the hub and the glass are concentric with respect to each other. Once the testing is completed, the hub and magnet can be easily removed from the glass and reused. The present invention thus easily adapts hubless glasses so that they can be mounted onto an orders measurement device having a spindle, without requiring any changes to the hubless glass's basic structure and without adding any obstructions that could prevent laser light from passing through the glass during testing.

DETAILED DESCRIPTION OF THE PREFERRED EMBODIMENT

Figure 1:
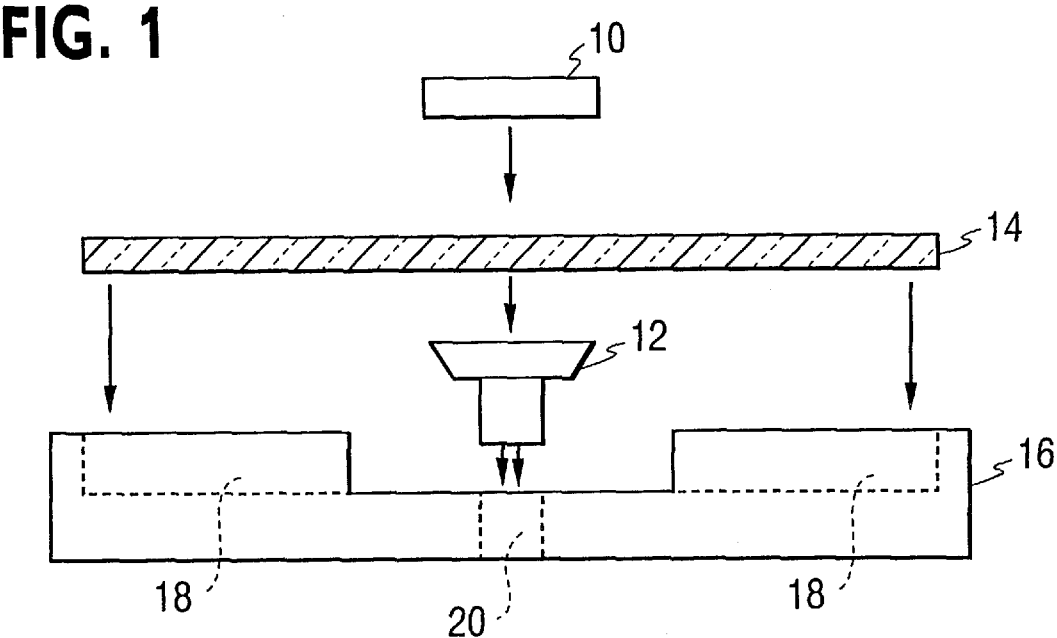
FIG. 1 is an exploded side view showing the separate components of system of the present invention.
Figure 2:
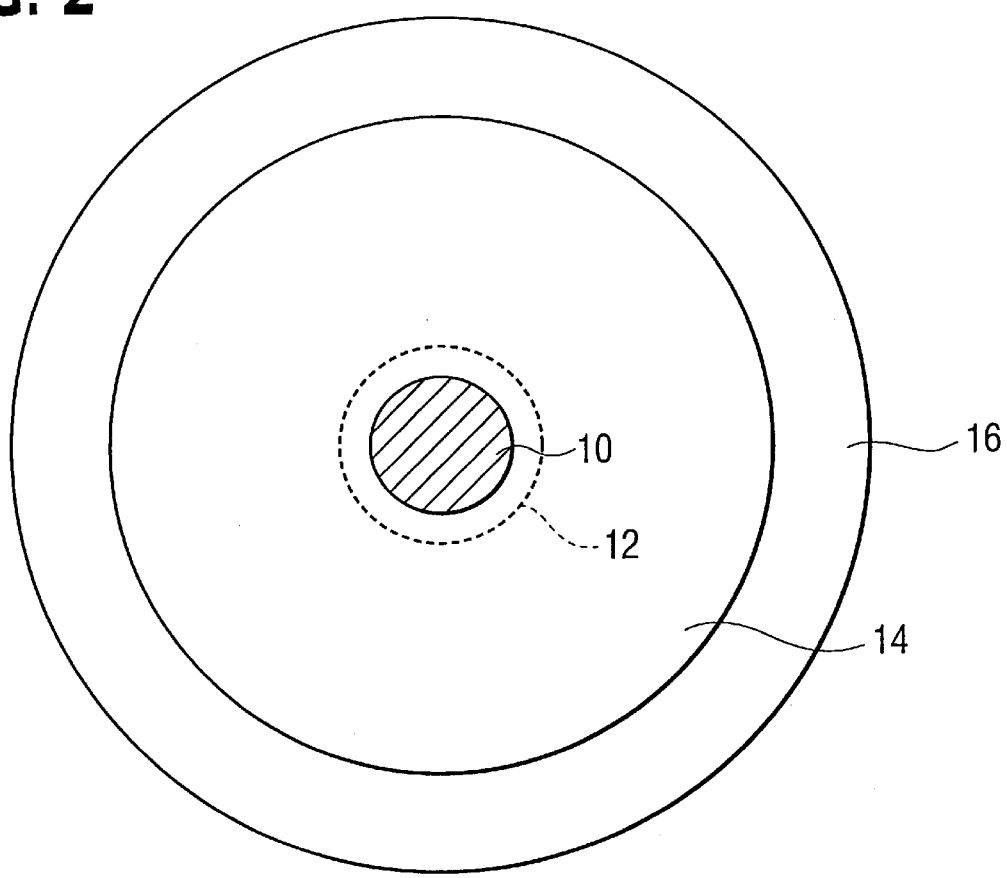
FIG. 2 is a top view of a preferred embodiment of the present invention, where the glassmaster is disposed insided an alignment fixture when a hub is attached.

FIGS. 1 and 2 illustrate the components in a preferred embodiment of the present invention. The system includes a magnet 10 and a magnetic hub 12 for adapting a hubless glassmaster 14 ("glass")for testing in an orders measurement device that is specifically designed for accommodating hubbed glasses via a spindle (not shown). The system can also include an alignment fixture 16 for ensuring that the glass 14 and the hub 12 are concentric with respect to each other to ensure accurate measurements when a laser is scanned through the glass 14 as the glass 14 is being rotated. This alignment fixture 16 does not form part of the glass assembly that is ultimately mounted onto the measurement device's spindle. Instead, the alignment fixture 16 is used only to position the hub 12 in the correct concentric position on the glass 14 before it is anchored in place with the magnet 10.

The alignment fixture 16 includes a first opening 18 that is shaped to receive the glass 14 and a second opening 20 underneath the first opening 18 for accommodating the hub 12. The first and second openings 18, 20 are preferably concentric with each other to ensure that the glass 14 and the hub 12 are also concentric with each other once they are positioned inside the alignment fixture 16, as shown in FIG. 2.

Figure 3:
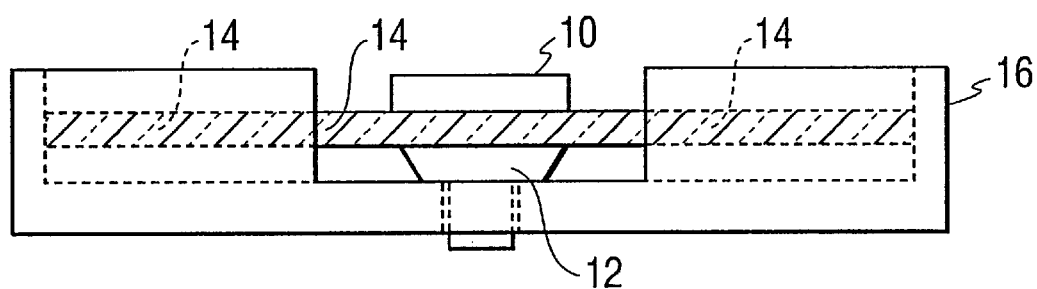
FIG. 3 is a side view of the embodiment shown in FIG. 2.
Figure 4:
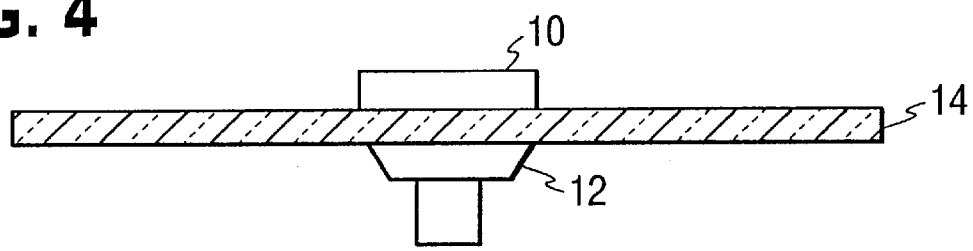
FIG. 4 is a side view of the present invention when it is removed from the alignment fixture.

To attach the hub 12 to the glass 14, the hub 12 is simply be placed on the bottom surface of the glass 14 and the magnet 10 is placed on the top surface of the glass 14, as shown in FIG. 4. Because the hub 12 is made of a magnetic material, the attractive magnetic forces between the hub 12 and the magnet 10 hold the glass 14 securely in between them. Although the hub 12 and the magnet 10 can simply placed on the glass 14 before the glass 14 is mounted onto a spindle in the orders measurement device, as shown in FIG. 3, the alignment fixture 16 offers increased precision in the hub 12 position on the glass 14.

FIGS. 2 and 3 are top and side views, respectively, of the invention when the magnet 10, the hub 12, and the glass 14 are assembled together inside the alignment fixture 16. In the preferred embodiment, the hub 12 is first placed into the second opening 20 of the alignment fixture 16. Note that the top portion of the hub 12 is larger than the second opening 20 so that the hub's top surface can contact the glass 14 when the glass 14 is placed into the alignment fixture 16. Next, the glass 14 is placed in the first opening 18 of the alignment fixture 16 to cover the hub 12. The magnet 10 is then placed on top of the glass 14 over the hub 12 to hold the hub 12 firmly in place through attractive magnetic force.

When all of the components are assembled in the alignment fixture 16, the glass 14 is nested within the alignment fixture 16 and the magnet 10 rests on the top surface of the glass 14. The hub 12 (represented by dotted lines in FIG. 2) is disposed underneath the magnet 10 and the glass 14 and held into place against the bottom surface of the glass 14 by attractive magnetic forces between the hub 12 and the magnet 10, as explained above. Once the glass 14 has the hub 12 attached to its bottom surface in this manner, it is carefully removed from the alignment fixture 16 to maintain the concentric alignment between the hub 12 and the glass 14. The resulting "hubbed" glass 14 is ready for mounting onto a spindle on the orders measurement device.

The rotation of the spindle and thereby the glass 14 during testing is relatively slow, so the magnetic forces between the hub 12 and the magnet 10 are sufficient to hold the hub 12 in place. When the testing process is over, the hub 12 and magnet 10 are simply removed from the glass 14 surfaces and can be used in another glass to be tested. Because the hub 12 is held in place using magnetic force and not adhesive, removing the hub 12 from the glass 14 is a simple, quick process that leaves no marks or damage on the glass 14 surface.

Thus, the system of the present invention allows temporary hub attachment to hubless glasses so that they can be mounted in an orders measurement system with spindles designed for testing only hubbed glasses. Further, the system of the present invention does not require permanent attachment of hubs to hubless glasses, allowing easy removal and reuse of hubs when testing many different glasses in an orders measurement system.

It should be understood that various alternatives to the embodiments of the invention described herein may be employed in practicing the invention. It is intended that the following claims define the scope of the invention and that the methods and apparatus within the scope of these claims and their equivalents be covered thereby.

What is claimed is:

1. A system for mounting a glassmaster onto a measurement device that inspects digital data recorded on said glassmaster, wherein said glassmaster serves as a template from which optical discs are mass produced after inspection by said measurement device, the system comprising:
    a magnet placed on a first surface of the glassmaster; and
    a hub comprising a magnetic material for mounting on a spindle in the measurement device, said hub being placed on a second surface of the glassmaster opposite the magnet such that the glassmaster is disposed between the magnet and the hub, wherein a magnetic force between the magnet and the hub holds the hub against the second surface of the glassmaster.

2. The system of claim 1, further comprising an alignment fixture having a first opening for accommodating the glassmaster and a second opening within the first opening for accommodating the hub, wherein said alignment fixture aligns the hub such that the hub and the magnet are concentric with respect to each other.

3. A method for mounting a glassmaster onto a measurement device that inspects digital data recorded on said glassmaster, wherein said glassmaster serves as a template from which optical discs are mass produced after inspection by said measurement device, the method comprising:
    placing a magnet onto a first surface of the glassmaster;
    placing a hub on a second surface of the glassmaster opposite the magnet such that the glassmaster is held in between the magnet and the hub; and
    mounting the hub onto a spindle in the measurement device.

4. The method of claim 3, further comprising:
    placing the hub in an alignment fixture having a first opening for accommodating a glassmaster and a second opening for accommodating the hub, the hub being placed in the second opening;
    placing the glassmaster in the first opening of the alignment fixture so that the glassmaster and the hub are concentric with respect to each other when the hub is attached to the second surface of the glassmaster; and
    removing the glassmaster having the magnet and the hub attached to the first surface and second surface, respectively, from the alignment fixture before mounting the hub onto the spindle in the measurement device.

5. The system of claim 1, wherein said glassmaster is a continuous disc without a hub or opening in a center thereof.

6. The system of claim 2, wherein:
    said hub comprises a first elongated portion and a second broader portion at an end of said elongated portion;
    said second opening is sized to receive said first elongated portion, said broader portion remaining above said second opening; and
    said broader portion engages said second surface of said glassmaster when said glassmaster is placed in said first opening.

7. The method of claim 3, wherein said glassmaster is a continuous disc without a hub or opening in a center thereof.

* * * * *